Aug. 31, 1965
L. MYERS
3,203,343
JUICE EXTRACTOR
Filed Dec. 3, 1963
4 Sheets-Sheet 1
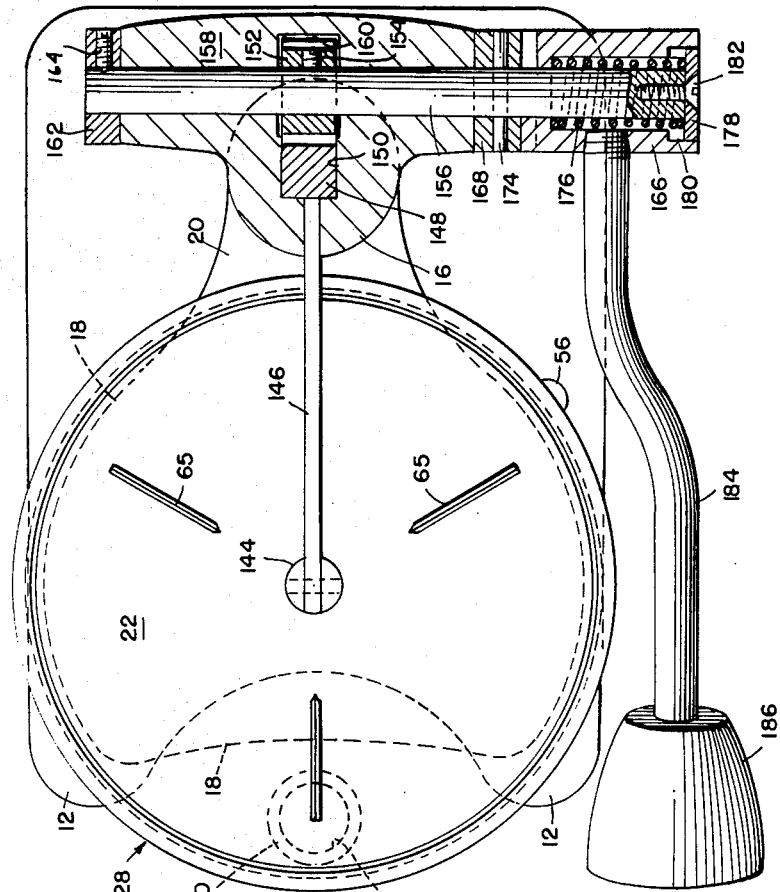
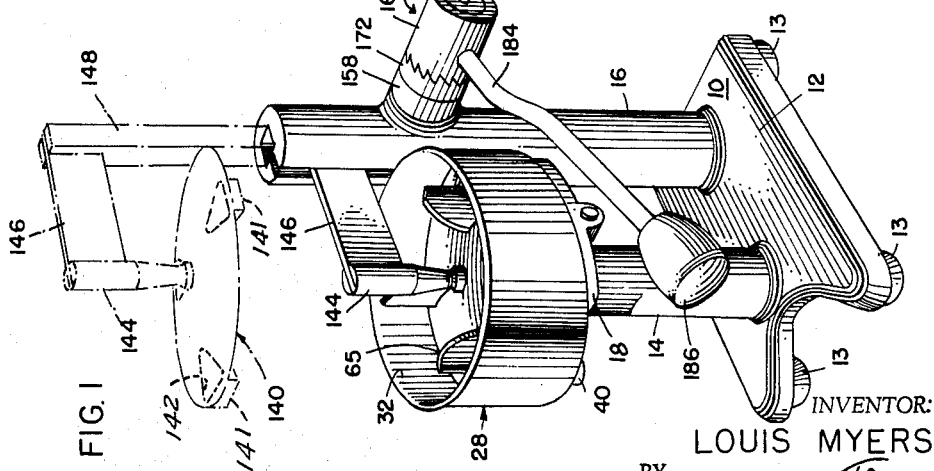
INVENTOR:
LOUIS MYERS
BY
Norman Gerlach
ATT'Y

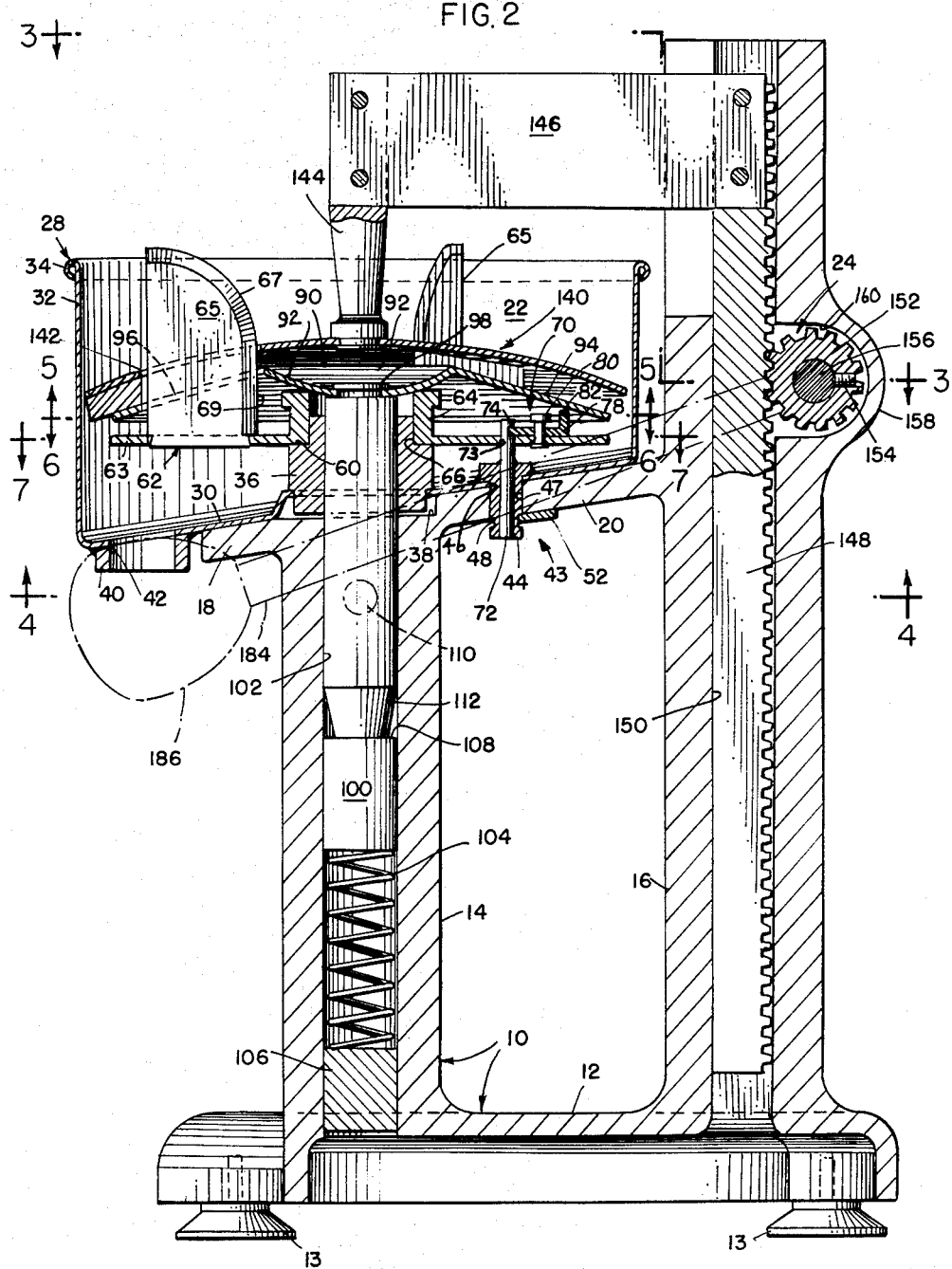

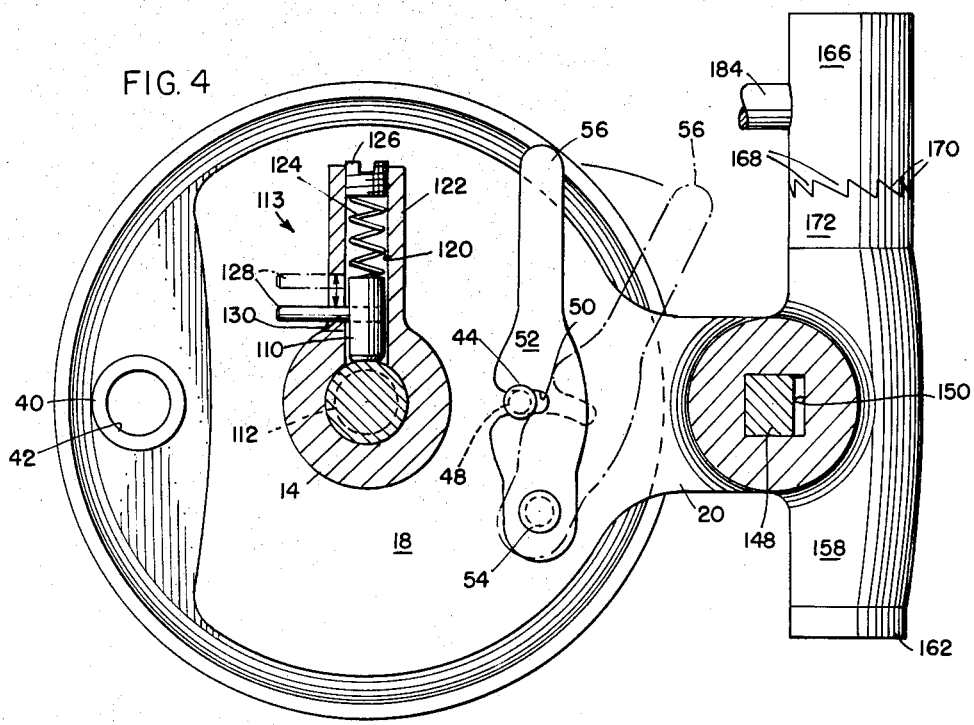
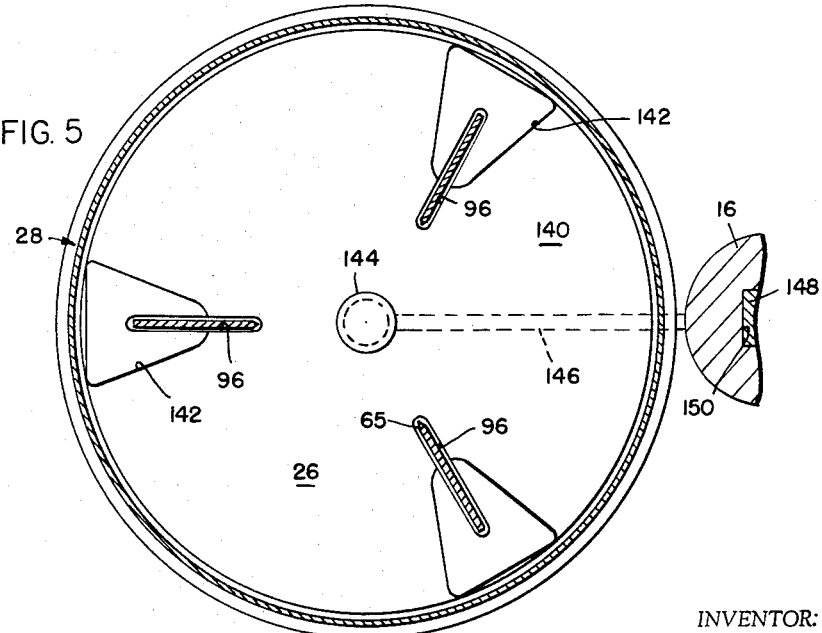

Aug. 31, 1965  L. MYERS  3,203,343

JUICE EXTRACTOR

Filed Dec. 3, 1963  4 Sheets-Sheet 4

INVENTOR:
LOUIS MYERS
BY
ATT'Y

United States Patent Office 3,203,343
Patented Aug. 31, 1965

3,203,343
JUICE EXTRACTOR
Louis Myers, 2111 Vernon St., Rockford, Ill.
Filed Dec. 3, 1963, Ser. No. 327,615
7 Claims. (Cl. 100—98)

The present invention relates to juices extractors and has particular reference to that type of extractor which is designed especially for use in expressing the juice of citrus friuts, such, for example, as oranges and lemons which are characterized by rind-enclosed inner fruit sections embodying pulp and seeds. Still more specifically, the invention is concerned with that type of juice extractor in which a series of radially extending blades create slits in the sides of a fruit, the slits completely penetrating the outer rind without completely dividing the fruit into sections or pieces and the slits creating a "Japanese" lantern effect in the rind so that when axial pressure is applied to the fruit after slitting thereof, the interior of the fruit is compressed while the slits are opened up to discharge the juice radially outwardly of the rind.

Heretofore, a juice extractor which operates upon the principle briefly outlined above has been extremely difficult to cleanse, the difficulty arising from the inability readily to dismantle the constituent parts of the extractor. Even though complete separation of the component individual parts, such as the juice collecting bowl, the fruit-supporting cradle, the knife-carrying slicing element, and the pressure plate, has been made possible, the difficulty involved in effecting such separation for rinsing or washing of these parts has discouraged the dismantlement of the extractor except after long intervals of time, and thus, unsanitary conditions have been prevalent.

The present invention is designed to overcome the above-noted limitation of sanitation that is attendant upon the construction and use of conventional or previously-designed whole fruit juice extractors and, accordingly, it is among the principal objects of the invention to provide a juice extractor which embodies a novel combination of component parts which is conducive toward ease of rapid dismantlement and reassembly. Briefly, in carrying out this object, the invention contemplates the provision of a juice extractor embodying a bowl support and a bowl assembly, the latter including, as its principal parts, a bowl, a slicing member, a fruit-supporting cradle, and a pressure plate. Such parts has associated therewith three relatively simple and easily accessible latch and manipulatable mechanisms, one of which serves releasably to latch the bowl to the bowl support, another of which serves releasably to latch the slicing member to the bowl, and the third of which serves releasably to latch the fruit-supporting cradle in position within the bowl, this latter latching mechanism being effective between the slicing element and the bowl support. Two of the latch mechanisms are exposed and accessible for manipulation at all times, while the remaining latch or third mechanism becomes exposed and accessible only after prior removal of a particular part of the extractor. Alternative methods of dismantlement are made possible whereby all of the parts are capable of being removed and disassociated from one another for independent cleaning, thus exposing the bowl support for cleaning purposes, or whereby the internal parts which are normally disposed within the bowl, may be removed from the bowl for independent cleaning while the bowl is left intact upon its support and is thus accessible for flushing or rinsing.

The three heretofore mentioned latching mechanisms, when considered in their environment, constitute the principal features of the present invention.

In the accompanying four sheets of drawings forming a part of this specification, one illustrative embodiment of the invention has been shown.

In these drawings:

FIG. 1 is a perspective view of a juice extractor constructed in accordance with the principles of the present invention;

FIG. 2 is an enlarged sectional view taken substantially centrally and vertically through the juice extractor, with the working or operative parts of the extractor being shown in their respective operative juice-expressing positions;

FIG. 3 is a horizontal sectional view taken on the line 3—3 of FIG. 2;

FIG. 4 is a horizontal sectional view taken on the line 4—4 of FIG. 2;

FIG. 5 is a horizontal sectional view taken on the line 5—5 of FIG. 2;

Figure 6:
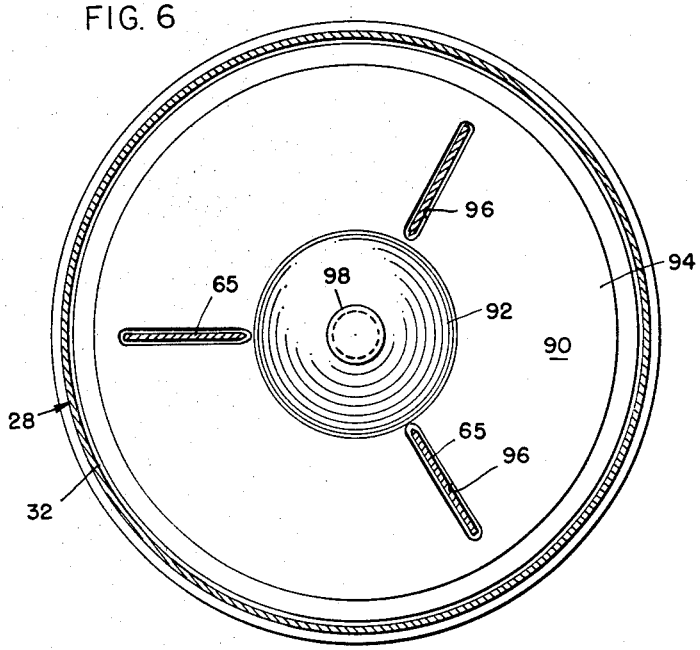
FIG. 6 is a horizontal sectional view taken on the line 6—6 of FIG. 2.

Referring now to the drawings in detail and in particular to FIGS. 1 and 2, the juice extractor of the present invention involves in its general organization a main body casting 10 which preferably is made up from a light-weight alloy, such as aluminum, or some other similar material which is capable of receiving a high polish so that it may readily be cleaned. It will be realized that in a juice extractor of this type or character, sanitation is essential and, therefore, it is desired that the extractor be maintained in a clean polished condition. The body casting may, if desired, be formed of stainless steel or it may be a ferrous casting to which there is applied a baked enamel or lacquer coating.

The main body casting 10 includes a base 12 which is supported on suction cups 13 and from which there projects upwardly a tubular front pedestal 14 and a tubular rear column 16. The upper end of the pedestal 14 is joined to the medial region of the rear column 16 by an inclined bowl support 18. The latter is of generally circular design and has a narrow rearwardly extending neck portion 20 that merges and is integral with the central upper portion of the rear column 16, as best illustrated in FIGS. 3 and 4 of the drawings. The pedestal 14 is provided for the purpose of supporting an extractor bowl assembly 22 while the tubular column 16 is provided for the purpose of supporting an operating mechanism 24 by means of which a compression plate 26 in associated relation with the bowl assembly 22 may be actuated in a manner and for a purpose that will be set forth in detail presently.

The bowl assembly 22 includes a bowl 28 which is of upright cup-shape design and includes a sloping bottom wall 30 and a continuous upstanding cylindrical side wall 32 having an out-turned rim flange 34. The bowl support 18 is downwardly and forwardly inclined to conform to the slope of the bottom wall 30 of the bowl 28, and a pilot hub 36 at the central portion of the bowl bottom wall 30 extends into a clearance recess 38 in the bowl support 18 at the top of the pedestal 14.

The forward region of the bowl bottom wall 30 overhangs the forward edge of the bowl support 18, and a depending drain spout 40 forms a downward extension of a circular drain opening 42 in the front portion of said bottom wall and serves as a medium for directing squeezed or extracted juice downwards from the bowl into a subjacent receptacle (not shown).

In order releasably to lock the bowl 28 in its operative position on the bowl suport 18, a latch mechanism 43 is provided. This latch mechanism constitutes one of three novel latch mechanisms of the improved juice extractor, the three latch mechanisms enabling complete dismantling of the component parts of the bowl assembly for purposes of cleaning and polishing. The latch mechanism 43 includes a vertically extending tubular latch pin 44 in the form of a cylindrical ferrule which is welded in position within an opening 46 in the bottom wall 30 of the bowl 28, projects downwardly below said bottom wall, and extends through a vertical cylindrical hole 47 in the bowl support 18. An annular groove 48 in the lower end of the latch pin 44 cooperates with the side edges of a notch 50 in the central or medial portion of a substantially horizontal latching lever 52 (see FIG. 4). Said lever is pivoted on a stud 54 which is connected to and depends from the underneath side of the bowl support 18. As shown in FIGS. 3 and 4, the lever 52 has a handle portion 56 which overhangs an edge of the bowl support so that it is manually accessible for manipulation of the latching lever 52 between its operative full-line latching position and its broken line position of release. When the latching lever 52 is in its latching position, the bowl 28 is maintained seated on the bowl support 18. When the lever 52 is moved to its position of release, the latch pin 44 is released for withdrawal from the hole 47 to the end that the bowl 28 may be lifted vertically from the support 18 and thus removed from the main body casting 10.

Removably positioned within the bowl 28 and seated on an annular upwardly facing seating shoulder 60 on the pilot hub 36 of the bowl 28 is a fixed slicing member 62 in the form of a flat circular plate 63 having a central seating hub 64 which surrounds a central opening 66, projects upwardly therefrom, is coaxial with the pilot hub 36 of the bowl 28 and is adapted to seat on the shoulder 60. Suitably secured to the plate 63, forming a part of the slicing member 62, and projecting upwardly from the plate is a series of three thin flat slicing blades 65. The latter lie in respective vertical radial planes which are disposed at angles of 120° from one another and are spaced about the seating hub 64. The blades 65 have sharp arcuate slicing edges 67 which merge into vertical slicing edges 69.

The three radial blades 65 are concentrically disposed on the plate 63 and their slicing edges 67 and 69 are so positioned that when a citrus fruit is passed or forced downwardly between these knives and axially of the bowl 28, the edges 67 and 69 will penetrate the fruit successively and establish three vertical slits in the sides of the fruit, the slits being of appreciable depth and extending well within the surface of the fruit and also within the rind. While three radially disposed equally spaced blades 65 have been illustrated herein, it is to be understood that a greater or lesser number of such blades, appropriately placed, may be employed if desired.

Figure 7:
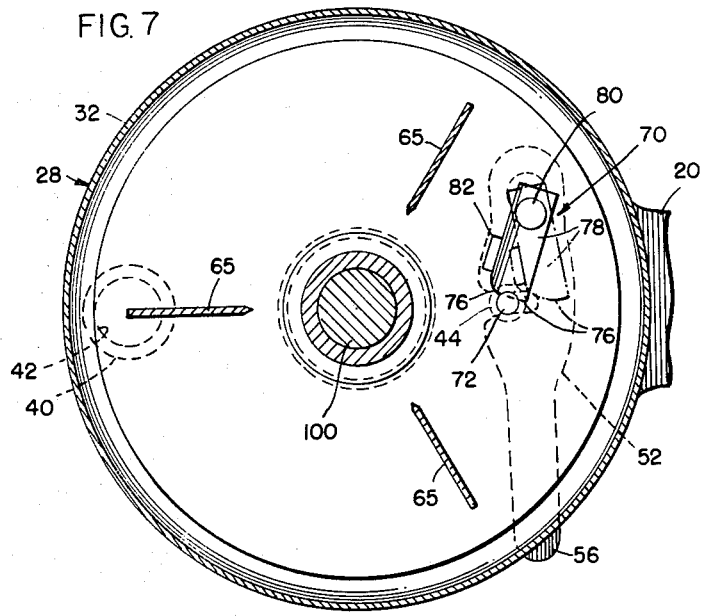
FIG. 7 is a horizontal sectional view taken on the line 7—7 of FIG. 2.

The slicing member 62 is adapted to be releasably latched in position within the confines of the bowl 28 by means of a second latch mechanism 70 (see FIGS. 2 and 7) which, when in its position of relase, permits the slicing member 62 to be lifted bodily from the bowl 28. This latch mechanism includes or embodies a vertically extending latch pin 72 which projects axially through the tubular latch pin 44 that is associated with, and forms a part of, the first latch mechanism 43 and is suitably fixedly secured therein. The latch pin 72 constitutes, in effect, an upward extension of the latch pin 44 and projects upwardly through a hole 73 in the plate 63. The upper end of the latch pin 72 is provided with a transverse groove 74 which is adapted to cooperate with one end edge 76 of an elongated horizontally extending second latching lever 78. The latter is pivoted on a vertically extending stud 80 (see FIG. 7) and overlies the upper face of the plate 63. An upturned ear 82 on the second latching lever 78 facilitates manipulation of the latter. The latching lever 78 is movable between its full-line position as shown in FIG. 7 wherein its edge 76 is disposed within the groove 74 so as to prevent upward movement of the plate 63 and consequent removal of the slicing member 62 from the bowl 28, and its dotted-line position wherein the plate 63 is released for such upward movement for removal purposes.

Disposed immediately above the plate 63 of the slicing member 62 and movable between the raised dotted-line position of FIG. 2 and the lowered full-line position of the same figure is a fruit-suporting cradle 90. The latter includes a cradle proper 92 in the form of a shallow downwardly dished member from the periphery or rim of which there extends a frusto-conical drip apron 94 of wide slant angle and small slant height. The apron 94 is provided with a series of three narrow radially extending slots 96 (see FIG. 5), these slots being designed for sliding reception over the radial knives 65 during vertical movements of the cradle 90 within the bowl 28.

The central or apex region of the cradle proper 92 of the cradle 90 is fixedly secured by a rivet structure 98 to the upper end of a vertically extending and slidable plunger 100, the plunger being slidable in a vertical bore 102 in the pedestal 14. The plunger 100 is yieldingly urged upwardly by means of a spiral compression spring 104, the lower end of which seats upon a fixed plug 106 in the lower end of the bore 102 and the upper end of which bears against the lower end of the plunger. The normal position of the plunger 100 and the fruit-supporting cradle 90 is an elevated position and in such position, an upwardly facing annular shoulder 108 on the lower end portion of the plunger bears against the inner end of a horizontal radially extending combined limit stop and latch pin 110 which projects into the bore 102 and determines the uppermost position of the fruit-supporting cradle 90. The latch pin 110 constitutes as element of the third latch mechanism 113 (see FIG. 4). A frusto-conical section 112 of the plunger immediately above the shoulder 108 is designed for camming engagement with said inner end of the pin 110 so that the plunger may be readily shifted downwards from its fully raised position when downward pressure is applied thereto.

The combined limit stop and latch pin 110 is slidable in a radial bore 120 in a tubular boss 122 which is formed integrally with and extends radially outwards from the upper end of the pedestal 14. The latch pin 110 is normally maintained in its projected position by means of a spiral compression spring 124, one end of which bears against a threaded plug 126 in the outer end of the boss 122 and the other end of which bears against the pin. A manipulating latch handle 128 for the pin 110 is connected fixedly to and extends radially outwards from the central portion of the pin and projects through a slot 130 in the wall of the boss 122. During successive operations of the juice extractor, the latch pin will slide on the cylindrical surface of the plunger 100, moving inwardly when the frusto-conical section 112 is encountered and moving outwardly so as to ride on the above cylindrical outer surface of the plunger 112 when the plunger is depressed. When the latch pin 110 is fully retracted as shown in dotted lines in FIG. 4, the pin is withdrawn from the path of movement of the shoulder 108 so that the entire plunger and the fruit-supporting cradle 90 may be removed upwards and bodily as a unit from the bowl 28.

Disposed immediately above the fruit-supporting cradle 90 is a circular pressure plate 140 of inverted dish-shape configuration and having spacer feet 141 on the underneath side and in the peripheral region thereof. The diameter of such plate is slightly less than the diameter of the cylindrical side wall 32 of the bowl 28. The pressure plate is provided with a series of relatively large, generally triangular, clearance openings 142 (see FIG. 5) to receive the radial slicing blades 65. The pressure plate 140 is suspended from a vertically extending post 144 which has its upper end fixedly connected to the distal or outer end of a horizontal supporting arm 146. The proximal or inner end of the arm 146 is secured to an elongated, vertically disposed, toothed rack 148 which is slidable within a vertically extending square bore 150 in the rear column 16. The rack 148 meshes with a pinion 152 which is pinned as at 154 to the medial region of a horizontal shaft 156. The ends of the shaft are rotatably journalled in the outer end portions of a horizontal hub 158 which is formed on and extends tangentially with respect to the upper central region of the column 16 (see FIG. 3). A clearance region 160 is provided in the central portion of the hub 158 to accommodate the pinion 152.

Referring now to FIGS. 3 and 4, retaining collar 162 is secured to one end of the shaft 156 and is held thereon by a set screw 164. The other end of the shaft 156 telescopically receives thereover a clutch hub 166 having formed thereon clutch teeth 168 which cooperate with similar teeth 170 on a clutch collar 172. The latter is pinned as at 174 to the shaft 156. A spiral compression spring 176 yieldingly urges the clutch hub 166 against the clutch collar 172. This spring surrounds the adjacent end of the shaft 156, is disposed in the adjacent end of the tubular hub 158, and has its outer end in abutment with a retaining plate 178. The latter is disposed within a clearance socket 180 in the adjacent end of the hub 166 and is secured in position by a screw 182. The clutch hub 166 carries a radially extending operating lever 184 having a knob-like handle 186 at its distal end.

From the above description, it will be seen that upon vertical swinging movements of the lever 184, the consequent angular turning movements of the clutch hub 166 will be transmitted to the clutch collar 172 through the mating clutch teeth 168 and 170, and from thence, to the shaft 156 and the pinion 152. Turning movement of the pinion 152 will cause vertical shifting of the rack 148 either to raise or lower the supporting arm 146 and the pressure plate 140, depending, of course, upon the direction of turning movement of the lever.

In the operation of the herein-described juice extractor, with the pressure plate 140 fully raised, a whole fruit, such as an orange, is placed on the fruit-supporting cradle proper 92 and the lever 184 is swung so as to lower the pressure plate and thus apply pressure to the fruit. It will be understood that in FIG. 2, the pressure plate 140 and the fruit-supporting cradle 90 are shown in their operative juice-expressing positions. Normally, the cradle 90 will assume an elevated position wherein it is substantially at the level of the upper rim of the bowl 28. When the fruit is deposited on the cradle 90, the plunger 100 will move downwardly within the bore 102 under the influence of the gravitational weight of the fruit until the spring 104 is in equilibrium. Thereafter, as the pressure plate 140 moves downwardly, the fruit is carried downwardly and the cradle 90 seats upon the upper rim of the tubular seating hub 64 of the fixed slicing member 62. During this downward movement of the cradle 90 and the whole fruit that is carried thereby, the radial knives 65 penetrate the fruit and create therein three radial slits of appreciable depth, the slits completely traversing the depth of the rind of the fruit and entering some of the fruit pulp sections. The fruit rind, when considered as a hollow sphere, is thus cut in the manner of a "Japanese" lantern and the pressure which is brought to bear upon the north and south poles of the fruit by the pressure plate 140 and the cradle 90, respectively, flattens the fruit, thus opening up the slits in the sides thereof and creating within the fruit an internal pressure which expresses the juice radially outwardly through the opened slits. This expressed juice runs downwardly and outwardly by gravity upon the frusto-conical drip apron 94 and falls to the bottom of the bowl 28 from which it flows through the drain spout 40 so that it may be collected in any suitable receptacle beneath the spout.

After the juice has been thus expressed from the fruit, pressure on the lever 184 is relieved and the pressure is thus raised. Elevation of the pressure plate 140 allows the spring 104 to elevate the plunger 100 and its attached cradle 90 so as to raise the crushed and juice-free fruit to an accessible position where it may be manually removed from the bowl of the extractor.

To dismantle the extractor for the purpose of cleaning the various parts thereof, with the pressure plate 140 and the cradle 90 in their positions as described above, the latch handle 128 is first manipulated in order to withdraw the latch pin 110 from the bore 102 in the pedestal 14 to the end that the pressure plate 140 and its attached rack 148 may be lifted bodily as a unit from the pedestal. Thereafter, the latching lever 52 is manipulated to release the tubular latch pin 44 and allow the bowl assembly 22, including the bowl proper 28 and the blade-carrying slicing member 62, to be lifted bodily as a unit from the inclined bowl support 18. With the bowl assembly 22 thus removed, the latching lever 78 is swung or manipulated with respect to the latch pin 72 and thus free the slicing member 62 from the bowl proper 28, complete separation of the slicing member 62 from the bowl proper being effected by withdrawing the three radial knife blades 65 from the triangular clearance openings 142.

It is obvious that, alternatively, dismantlement of the parts may be effected by manipulating the latching lever 78 before release of the bowl proper 28 from its supported position on the support 18. This operation permits removal of the slicing member 62 independently of the bowl proper 28 for blade-cleaning purposes when, for example, submersion of the bowl is not considered necessary for cleaning purposes and a mere rinsing or flushing of the same in position on the support 18 is all that is required.

Reassembly of the various constituent parts of the juice extractor is accomplished by a reversal of the procedure outlined above in connection with its dismantlement.

From the above description, it is believed that the many advantages of the present invention will be apparent. The improved extractor is extremely simple in its construction. Its principle of operation and the construction of parts are such that little skill is required, either to operate it or to dismantle and reassemble it. Little wear is imposed upon the moving elements or parts thereof and, consequently, there is little necessity for repair or replacement of parts. Sanitation of the extractor is enhanced by reason of the ease with which it may be taken apart for cleaning purposes. The efficiency of the extractor is apparent since substantially all of the juice is expressed from the fruit while the pulp and seeds are retained within the rind and the latter is maintained in one piece for disposal bodily as a single unit.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by letters patent is:

1. In a juice extractor for expressing the juice of fruits, in combination, a tubular pedestal, a shelf-like bowl support on the upper end of the pedestal, a juice-collecting bowl having a substantially flat bottom wall removably seated on said bowl support, a hub projecting upwardly from said bottom wall into the bowl centrally thereof, a slicing member in the form of a flat plate removably seated on the hub within the bowl, a series of thin flat radial slicing blades projecting upwardly from said plate, a vertical plunger telescopically slidable in said tubular pedestal and projecting upwardly through the hub and plate, a fruit-supporting cradle mounted on the upper end of the plunger and movable bodily therewith between a raised position within the bowl wherein the fruit supported thereby is disposed above the level of said slicing blades and a lowered position wherein the fruit is penetrated by said slicing blades, spring means yieldingly urging said plunger and cradle upwardly, first releasable latch mechanism effective between the plunger and pedestal for limiting the uppermost position of the cradle and preventing removal of the latter from the bowl, second releasable latch mechanism effective between the slicing member and bowl for preventing removal of the former from the latter, third latch mechanism effective between the bowl and support for preventing removal of the former from the latter, a vertically movable pressure member having clearance openings therein for reception of said slicing blades and positioned above the cradle and effective to force the fruit and cradle downwardly within the bowl to effect penetration of the fruit by said slicing blades and compression of the fruit between the pressure member and cradle, and means for moving said pressure member vertically in opposite directions.

2. A juice extractor as set forth in claim 1 and including, additionally, a frusto-conical drip apron on said cradle and having radial clearance slots therein through which the slicing blades project upwardly.

3. A juice extractor as set forth in claim 1 and wherein said pressure member is in the form of a circular inverted dome-shaped plate and said clearance openings are radial slots through which the slicing blades project upwardly.

4. A juice extractor as set forth in claim 1 and wherein said pressure member is in the form of a circular inverted dome-shaped plate and said clearance openings are radial slots through which the slicing blades project, said cradle being provided with a frusto-conical drip apron having radial slots through which the slicing blades also project upwardly.

5. In a juice extractor for expressing the juice of fruits, a tubular pedestal having a central bore therein, a shelf-like bowl support on the upper end of the pedestal, a juice-collecting bowl having a substantially flat bottom wall removably seated on said bowl support, a hub projecting upwardly from said bottom wall into the bowl centrally thereof, a slicing member in the form of a flat plate removably seated on the hub within the bowl, a series of thin flat radial slicing blades projecting upwardly from said plate, a vertical plunger telescopically slidable in said central bore and projecting upwardly through the hub and plate, a fruit-supporting cradle mounted on the upper end of the plunger and movable bodily therewith between a raised position within the bowl wherein the fruit supported thereby is disposed above the level of said slicing blades and a lowered position wherein the fruit is penetrated by said slicing blades, spring means yieldingly urging said plunger and cradle upwardly, first releasable latch mechanism effective between the plunger and pedestal for limiting the uppermost position of the cradle and preventing removal of the latter from the bowl, second releasable latch mechanism effective between the slicing member and bowl for preventing removal of the former from the latter, third latch mechanism effective between the bowl and support for preventing removal of the former from the latter, said first releasable latch mechanism comprising an upwardly facing shoulder on the plunger, a radial latch pin projecting through the wall of said pedestal and movable between an advanced position wherein it projects into said bore and into the path of movement of said shoulder and a retracted position wherein it is withdrawn from said bore, and spring means yieldingly urging the plunger to its advanced position, a portion of said latch pin being accessible exteriorly of the pedestal for manipulation, a vertically movable pressure plate having clearance openings therein for reception of said slicing blades and positioned above the cradle and effective to force the fruit and cradle downwardly within the bowl to effect penetration of the fruit by said slicing blades and compression of the fruit between the pressure member and cradle, and means for moving said pressure member vertically in opposite directions.

6. In a juice extractor for expressing the juice of fruits, in combination, a tubular pedestal, a shelf-like bowl support on the upper end of the pedestal, juice-collecting bowl having a substantially flat bottom wall removably seated on said bowl support, a hub projecting upwardly from said bottom wall into the bowl centrally thereof, a slicing member in the form of a flat plate removably seated on the hub within the bowl, a series of thin flat radial slicing blades projecting upwardly from said plate a vertical plunger telescopically slidable in said tubular pedestal and projecting upwardly through the hub and plate, a fruit-supporting cradle mounted on the upper end of the plunger and movable bodily therewith between a raised position within the bowl wherein the fruit supported thereby is disposed above the level of said slicing blades and a lowered position wherein the fruit is penetrated by said slicing blades, spring means yieldingly urging said plunger and cradle upwardly, first releasable latch mechanism effective between the plunger and pedestal for limiting the uppermost position of the cardle and preventing removal of the latter from the bowl, second releasable latch mechanism effective between the slicing member and bowl for preventing removal of the former from the latter, third latch mechanism effective between the bowl and support for preventing removal of the former from the latter, said third latch mechanism comprising a latch pin fixedly secured to the bottom wall of the bowl and projecting downwardly through said bowl support, a latching shoulder on said latch pin below the support, and a latching lever pivoted to the underneath side of the support and engageable with said latching shoulder, said second latch mechanism comprising an upward extension of the latch pin, there being a hole in said flat plate through which said upward extension projects upwardly, a latch shoulder on said upward extension above said flat plate, and a latching lever pivoted to the upper side of said flat plate and engageable with said latter latching shoulder, a vertically movable pressure plate having clearance openings therein for reception of said slicing blades and positioned above the cradle and effective to force the fruit and cradle downwardly within the bowl to effect penetration of the fruit by said slicing blades and compression of the fruit between the pressure plate and cradle, and means for moving said pressure member vertically in opposite directions.

7. A juice extractor as set forth in claim 6 and wherein said latch pin is in the form of an open-ended tube, and wherein said upward extension comprises a cylindrical pin projecting completely through said open-ended tube and extending upwardly thereabove, said latching shoulder associated with the second latch mechanism being provided in the portion of the pin which projects above the open-ended tube.

References Cited by the Examiner

UNITED STATES PATENTS

| | | | |
|---|---|---|---|
| 628,254 | 7/99 | Savage | 146—3.9 |
| 2,168,430 | 8/39 | Myers | 100—98 |
| 2,507,312 | 5/50 | Mariani | 100—213 X |
| 2,572,286 | 10/51 | Smith | 100—98 |
| 2,664,042 | 12/53 | Walker | 100—213 X |

WALTER A. SCHEEL, *Primary Examiner.*